United States Patent Office 3,450,979
Patented June 17, 1969

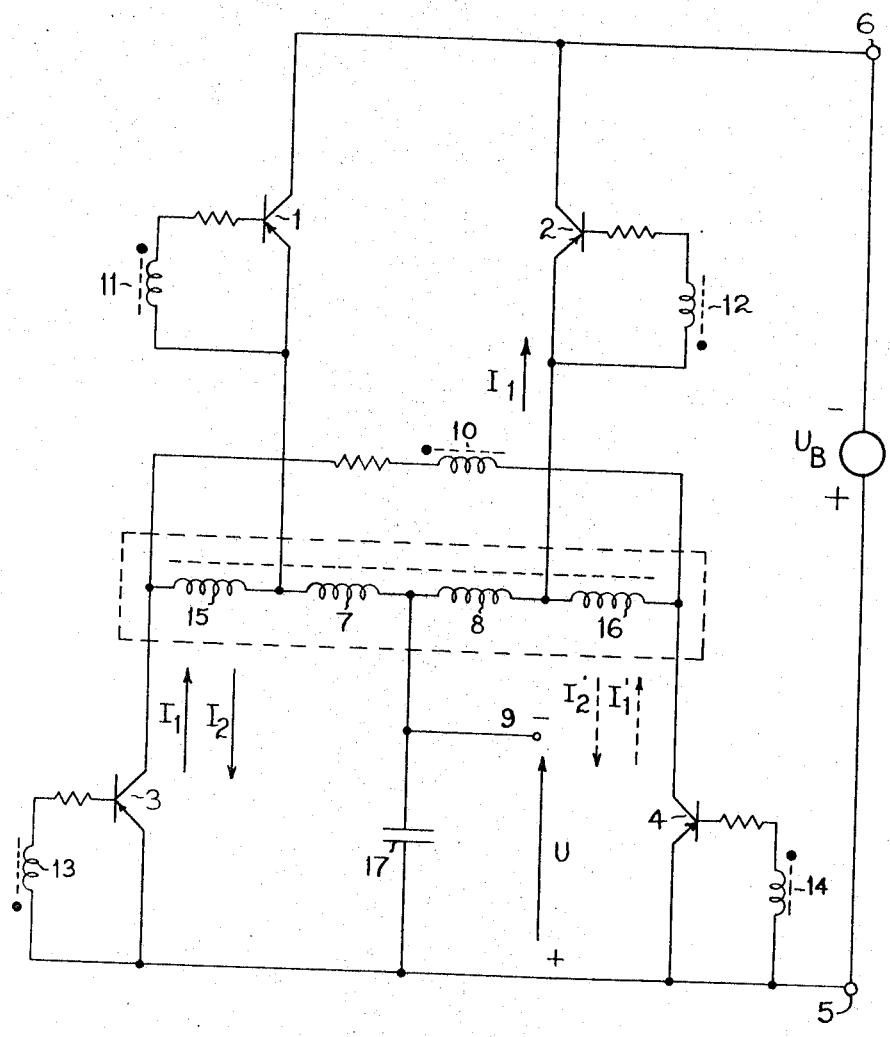

3,450,979
D.C. TO D.C. VOLTAGE DIVIDER UTILIZING TRANSISTOR BRIDGE
Ivan Horvat, Wettigen, Switzerland, assignor to Aktiengesellschaft Brown, Boveri & Cie, Baden, Switzerland, a joint-stock company
Filed July 26, 1966, Ser. No. 567,867
Claims priority, application Switzerland, July 28, 1965, 10,544/65
Int. Cl. H02p *13/14, 13/16*
U.S. Cl. 323—18    4 Claims

ABSTRACT OF THE DISCLOSURE

A D.C. to D.C. voltage divider includes a transistorized electrical bridge and the D.C. input is connected across one diagonal. An auto-transformer having a series connection of two windings is connected across the other bridge diagonal, and the D.C. output is taken between the connecting point of the two series connected auto-transformer windings and a terminal point of the first mentioned bridge diagonal. The auto-transformer is also provided with auxiliary windings to compensate for the voltage drop in the main windings of the auto-transformer and to obtain a voltage division different from 2.

---

This invention relates to voltage dividers and more particularly to voltage dividers of the direct current type.

The general object of the invention is to provide an improved voltage divider of the type described which enjoys particular advantages in current supply plants for transistorized apparatus in the field of industrial electronics.

For the production of various stabilized system voltages, which are necessary for feeding these industrial electronic devices, there have been generally used up to the present an arrangement wherein the direct current voltage, hereinafter referred to as D.C. voltage is divided by means of series-stabilizers. These arrangements are suitable for higher voltages, but at the often very low voltages required for transistor operation, they frequently lead to very high losses in the voltage divider.

In contrast therewith, the losses in the improved D.C. voltage divider according to the present invention are particularly small, and the division ratio is independent of the load to a very great extent.

In accordance with the invention, the D.C. voltage divider is provided with a D.C. voltage input, which is connected across the first diagonal of a bridge, a series connection of at least two windings of an auto-transformer which is connected across the second diagonal of the bridge, and a D.C. voltage output which is located between the connecting point of two adjoining windings of the auto-transformer and a terminal point of the first diagonal, switching elements being provided in each of the four bridge arms which open, or close the current circuits in the bridge arms, and which are so controlled that the voltage on the auto-transformer is periodically commutated.

The invention will be described with respect to one suitable embodiment thereof and from the accompanying drawing which illustrates it. The drawing shows the embodiment in schematic electrical diagram form.

With reference to the drawing: the direct current voltage divider comprises an electrical bridge, having switching elements in each of its four arms. The switching elements are formed by the collector and emitter terminals of switch-transistors 1, 2, 3 and 4. To the first diagonal of the bridge is applied the input D.C. voltage $U_B$, while to the second diagonal are connected two windings 7, 8 of an auto-transformer. These windings 7, 8, connected themselves in series, have the same number of turns. The output voltage U occurs between the connecting point of the windings 7, 8 and one terminal of the first bridge diagonal. In order to get a voltage division $U_B/U$ different from 2 and to compensate the voltage drop due to the ohmic resistances of the windings of the auto-transformer, additional windings 15 and 16 of the auto-transformer are provided in those bridge arms which are traversed by the load current.

For the control of the switch transistors 1–4 a feedback transformer is provided whose primary winding 10 is connected to the auto-transformer, while its four secondary windings 11, 12, 13 and 14 supply the emitter-base currents to the switch transistors. Parallel to the output terminals 5, 9 is arranged, as usual, a smoothing condensor 17.

This circuit works as follows:

Due to the feedback transformer an oscillation is excited and maintained in the circuit. This oscillation controls the switch-transistors alternately in two commutation-periods. Let it be assumed that transistors 2 and 3 are conductive during a first commutation period, while the two other transistors 1 and 4 block current flow through them. During this first commutation period the input current $I_1$ is closed over transistor 3, the windings 15, 7 and 8 of the auto-transformer, and transistor 2, while the load current $I_2$, flowing over the output terminals 5 and 9, is closed over transistor 3 and the windings 15, 8 of the auto-transformer. The current flowing through transistor 3 and the windings 15 and 8 of the auto-transformer has a height equal to $I_2-I_1$. In the second commutation period transistors 1 and 4 are conducting, while transistors 2 and 3 block the current. Now the input current $I'_1$ is closed over transistor 4, windings 16, 8 and 7 of the auto-transformer, and transistor 1, while the load current $I'_2$ is closed over transistor 4 and the windings 16, 8 of the auto-transformer. In the same manner as in the first commutation period the height of the current flowing through transistor 4 and windings 16, 8 is now, in the second commutation period, equal to the $I'_2-I'_1$.

The voltage division $U/U_B$ is substantially determined by the number of turns of the windings of the auto-transformer.

An advantage of this arrangement is that transistors 3 and 4 never are required to switch the full load current, but only have to switch one half of the load current with a voltage division $U/U_B=2$, for example.

I claim:

1. In a D.C. voltage divider, the combination comprising an electrical bridge having four bridge arms, a connection for the D.C. voltage input across a first diagonal of said bridge, an auto-transformer having a series connection of at least two windings having the same number of turns connected across the second diagonal of said bridge, a D.C. voltage output being taken between the connecting point of two adjoining windings of said auto-transformer and a terminal point of said first bridge diagonal, switching elements provided in each of the four arms of said bridge which functions to close and open the current circuits in said bridge arms, and means controlling said switching elements such that the voltage on said auto-transformer is periodically commutated.

2. A D.C. voltage divider as defined in claim 1 wherein said switching elements are formed by the emitter-collector zones of switch transistors.

3. A D.C. voltage divider as defined in claim 1 wherein said switching elements are formed by the emitter-collector zones of switch transistors, and said means controlling said switching elements is constituted by a feedback transformer, the primary voltage for said feedback transformer being tapped from said auto-transformer, and said feedback transformer being provided with four secondary windings each of which serves for the production of the emitter-base current in one of said bridge arms.

4. A D.C. voltage divider as defined in claim 1 wherein additional windings of said auto-transformer are provided in the bridge arms traversed by the load current.

References Cited

UNITED STATES PATENTS

| | | | |
|---|---|---|---|
| 2,821,639 | 1/1958 | Bright et al. | 323—75 X |
| 2,972,710 | 2/1961 | D'Amico | 323—75 X |
| 3,080,534 | 3/1963 | Paynter. | |
| 3,238,445 | 3/1966 | Sikorra | 323—75 |
| 3,373,338 | 3/1968 | Corey et al. | 323—22 X |

FOREIGN PATENTS 885,685   12/1961   Great Britain.

LEE T. HIX, *Primary Examiner.*

A. D. PELLINEN, *Assistant Examiner.*

U.S. Cl. X.R.

323—25, 75